United States Patent [19]

Allardice

[11] Patent Number: 4,554,122

[45] Date of Patent: Nov. 19, 1985

[54] METHOD FOR AIR BLADDER RELEASE DURING TIRE PRODUCTION

[75] Inventor: John M. Allardice, Allison Park, Pa.

[73] Assignee: Releasomers, Inc., Bradfordwoods, Pa.

[21] Appl. No.: 639,869

[22] Filed: Aug. 13, 1984

Related U.S. Application Data

[60] Continuation of Ser. No. 362,559, Mar. 26, 1982, abandoned, which is a division of Ser. No. 319,098, Nov. 6, 1981, , which is a continuation of Ser. No. 133,689, Mar. 25, 1980, abandoned.

[51] Int. Cl.$^4$ .................................... B29H 21/04
[52] U.S. Cl. .................................. 264/130; 264/213; 106/38.22; 524/267
[58] Field of Search ................. 264/130, 213; 425/39, 425/51; 156/289, 537; 106/38.22; 524/267

[56] References Cited

U.S. PATENT DOCUMENTS

| | | | |
|---|---|---|---|
| 3,483,062 | 12/1969 | Madge | 156/289 |
| 3,849,359 | 11/1974 | Nitzsche et al. | 524/755 |
| 3,905,823 | 9/1975 | Piskati | 106/38.22 |

*Primary Examiner*—Donald Czaja
*Assistant Examiner*—Hubert C. Lorin
*Attorney, Agent, or Firm*—Pearne, Gordon, Sessions, McCoy, Granger & Tilberry

[57] ABSTRACT

A method for the release of air bladders during tire construction involves the application of a bladder release composition directly upon the expandable air bladder in the tire production machinery. The bladder release composition typically consists of a blend of siloxanes, which when combined, provide significant air bleed qualities.

7 Claims, No Drawings

METHOD FOR AIR BLADDER RELEASE DURING TIRE PRODUCTION

CROSS-REFERENCE

This is a continuation application of application Ser. No. 362,559, filed Mar. 26, 1982, now abandoned, which in turn is a division of my prior pending application bearing U.S. Ser. No. 319,098, filed Nov. 6, 1981, which in turn is a continuation of U.S. Ser. No. 133,689, filed Mar. 25, 1980, now abandoned, all entitled: "METHOD AND COMPOSITION FOR BLADDER RELEASE DURING TIRE PRODUCTION."

BACKGROUND OF THE INVENTION

Heretofore, the method for producing vulcanized tires required a material to separate and release the tire production machinery from the tire carcass during vulcanization. Heretofore, tire production included movement of the uncured tire carcasses to a painting booth where a release material was sprayed on the interior of each tire carcass prior to be introduced to the tire production machinery. This machine, typically a conventional McNeil Corporation Bag-O-Matic, or NRM tire press machine, then vulcanized the tire under heat and pressure, whereby the air bladder expands to compress the carcass into the mold.

The interior of each uncured tire carcass was sprayed prior to its introduction into the tire production machinery. Without such material sprayed on the interior of the uncured tire carcass, upon heat and pressure, the tire carcass would crosslink and polymerize to the expandable air bladder of the machinery. The material sprayed on the interior of the uncured tire carcasses typically included glycol lubricants, silicone oil lubricants, mica or talc, and other chemicals known to those skilled in the art, for providing a releasable lubrication to the interior of the tire carcass, such as described in U.S. Pat. Nos. 4,039,143; 3,713,851; 3,531,624; 3,872,038; 3,905,823; 4,043,924; and 4,066,660. Conventional inside tire release fluids having solids are commercially available from many sources, including for example Harwick Chemical Company, C. P. Hall Company, General Electric Company, and Stauffer Chemical Company.

The inside tire release compositions require the use of solid material, such as mica or talc, to permit the interface between the uncured tire and the air bladder to bleed air as the air bladder expands. Without air bleeding, the tire cured with trapped pockets of air is defective. The solid materials dispersed in the release composition are not capable of withstanding repeated expansion and contraction of the air bladder. Therefore, the art has utilized an application of the composition having these solids to each uncured tire interior rather than a lasting application to the air bladder exterior.

Silicone compositions are frequently employed as release materials or films in a wide variety of applications. Treatment of leather, paper, metals, ceramics and other non-expanding surfaces are disclosed in U.S. Pat. Nos. 3,832,203; 3,674,484; 3,418,162; 3,849,359; 3,436,251; 3,941,856; 3,983,265; 3,846,506; 3,595,838; 3,532,766; 3,308,079; 3,524,900; 3,522,202; and 3,542,574. Silicone compositions have been employed for non-expanding molds and castings such as described in U.S. Pat. Nos. 3,723,567 and 3,883,628, but these compositions are not subjected to repetitive expansion and contraction of the mold or casting block. Finally, examples of silicone compositions for rubber or elastomer articles are disclosed in U.S. Pat. Nos. 3,654,985; 3,699,073; and 4,039,583. However, none of the silicone compositions disclosed in the patents listed in this paragraph are applied to the uncured tire interior or the expandable air bladder for tire production.

Because considerable capital and labor is required to spray each individual tire on its interior surfaces, prior to being placed in the tire production machinery, a need exists for a blend to be applied to the air bladder periodically to accomplish comparable release purposes over considerable production periods, using a composition that may withstand repeated expansion and contraction of the air bladder.

OBJECTS OF THE INVENTION

Therefore, it is an object of the invention to provide a method for the releasable placement of an uncured tire carcass in a tire mold having an expandable air bladder therewithin, wherein the air bladder releasably contacts the uncured tire carcass through the use of a repetitive release agent on the air bladder.

It is another object of the invention to provide a method for the releasable placement of an uncured tire carcass in a tire mold having an expandable air bladder therewithin, wherein the repetitive release agent cures into a film, upon application to the air bladder, and maintaining its release properties throughout a multiplicity of tire productions.

Yet another object of the invention is to provide a composition for the repetitive release of elastomeric materials, wherein the composition employs fluids which combine to form a blend having air bleed qualities upon curing on any expandable item.

These and other objects of the invention, which will become more apparent as the detailed description of the preferred embodiments proceeds, are achieved by a method for the releasable placement of an uncured tire carcass in a tire mold having an expandable air bladder therewithin, comprising the steps of: applying a repetitive release fluid blend to the surface of the air bladder of the tire mold; curing said repetitive release fluid blend onto the air bladder to create an expandable repetitive release film for repeated tire curing production.

DETAILED DESCRIPTION OF THE PREFERRED EMBODIMENTS

A detailed description of the preferred embodiment of the method and composition described herein is used upon application to a tire molding and curing apparatus, well known to those skilled in the art. The apparatus has an expandable air bladder which compresses an uncured tire carcass against a tread pattern under heat and pressure, simultaneously curing the carcass.

Because the molding and curing apparatus subjects the tire carcass to the pressure of expanding air bladder the interface between the tire carcass and air bladder must permit the bleeding of air during expansion. Further, as described above, if an uncured tire carcass is placed within apparatus without suitable release compositions between air bladder and the carcass, the temperature and pressure will crosslink the elastomeric composition of the air bladder with the tire carcass itself. Therefore, whatever composition is placed at the interface between air bladder and the interior of the tire carcass, that composition must provide not only for the releasable characteristics to facilitate easy removal of the tire from the production apparatus, but also provide an agent to bleed unwanted air from between the air bladder and the tire during molding and curing.

It is within the concepts of the present invention to apply the fluid blend disclosed herein to any expandable item, especially any expandable mandrel, of which class an expandable air bladder is a member. These releasable and air bleed characteristics are desirable in industry, generally in manufacturing operations.

As it was described above, the conventional methods for providing release and air bleed characteristics in a molding and curing apparatus was an individual painting of the interior of each and every uncured tire carcass prior to its insertion in that apparatus. This included considerable capital and labor devoted to individual spraying of each tire carcass, venting of the sprayed material according to environmental standards, and other typical requirements of an individualized procedure in a mass production facility. It has been found that eliminating the conventional methods of spraying each interior of every tire carcass eliminates considerable capital and labor, as described above.

In its place, the air bladder is coated with a repetitive release agent which not only satisfies the release and air bleed characteristics needed for tire production, but also the requirements of expandability and repetitive characteristics for economical tire production. Whereas, the conventional methods employ quality control of the painting area, elimination of that step in the process requires a repetitive release agent which cures into an expandable film on the expandable air bladder in such a way as to provide repetitive release and air bleed protection for the air bladder during a multitude of tire production runs. Without the continued performance of the expandable repetitive release film on the air bladder, after only one tire vulcanization in the tire molding apparatus, the same capital and labor requirements eliminated from the painting area would be required for application of a release material onto the air bladder. However, the lasting nature of the expandable repetitive release film eliminates such requirements in a competitive industry.

The expandable repetitive release film prior to curing on the air bladder comprises a fluid blend of several chemicals serving specified or multiple purposes or functions. The application of the fluid blend to the air bladder requires adhesive properties in the fluid blend prior to curing on to the air bladder. However, once the fluid blend is cured into an expandable repetitive release film, release and air bleed properties must exist. Therefore, the fluid blend comprises an adhesion agent, a curing agent, a slip agent, and a release agent.

The adhesion agent is an elastomeric resin and may be described as any of the self-curing silicone polymers upon exposure to moisture typified by 1 part RTV silicone polymer and aminofunctional diorganopolysiloxane resins, where 1 part RTV silicone polymer mean those resins which cure in the presence of moisture in the atmosphere at ambient temperature and where aminofunctional di-organopolysiloxane resins have the following general formula:

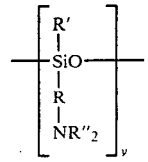

where v is a number up to 20,000, where R represents a divalent hydrocarbon radical having from 1 to 10 carbon atoms or a divalent hydrocarbonoxy radical selected from the group consisting of ($-OC_2H_4-$)$_r$, ($-OCH_2-$)$_r$, and ($OC_3H_6$)$_r$ and combinations thereof, where r is a number from 1 to 50, or an unsaturated divalent hydrocarbon radical having from 2 to 10 carbon atoms, and combinations thereof, where R' represents a monovalent hydrocarbon radical or halogenated monovalent hydrocarbon radical having from 1 to 18 carbon atoms, and combinations thereof, and where R" represents hydrogen, a monovalent hydrocarbon radical having from 1-12 carbon atoms, and combinations thereof, R" being the same or different in bonding to N.

Examples of suitable divalent hydrocarbon radicals are ethylene, trimethylene, tetramethylene, hexamethylene, octamethylene, and the like. Examples of suitable hydrocarbonoxy radicals are ethylene oxide, trimethylene oxide, methoxy, ethoxy, and the like. Examples of suitable unsaturated divalent hydrocarbon radicals are vinyl, propenylene, butenylene, hexenylene, and the like.

Examples of suitable monovalent hydrocarbon radicals are alkyl such as methyl, ethyl, propyl, and the like; aryl radicals such as phenyl, diphenyl, naphthyl and the like; alkaryl radicals such as vinyl and alkyl; cycloalkyl radicals such as cyclobutyl, cyclopentyl, cyclohexyl, and the like; aralkyl radicals such as tolyl, xylyl, ethylphenyl, alpha-phenylethyl, beta-phenylethyl, alpha-phenylbutyl and the like; and the halo-substituted radicals enumerated above.

Examples of R" radicals include hydrogen; alkyl radicals such as methyl, ethyl, and hexyl; and cycloalkyl radicals such as cyclobutyl and cyclopentyl, and cyclohexyl.

Of the various constituents R' and R", the preferred R' is methyl and the preferred R" are hydrogen and cyclohexyl.

Aminofunctional di-organopolysiloxane resins are also present in 1 part RTV silicone polymers presently, commercially available, for example as sold by SWS Silicones Corporation as RTV Dispersion SWS-960, SWS-931, SWS-960, T-38, and also sold by Dow Corning Company as 108 Fluid. In this commercial production, the aminofunctional polysiloxane is dispersed within Varnish Makers and Painters Naphtha; for example, Fluid SWS-960 comprises about 70 parts aminofunctional methylpolysiloxane resin and about 30 parts naphtha, having a boiling point from about 245° F. to 280° F. Upon self-curing, the aminofunctional di-organopolysiloxane resin in SWS-960 releases a cyclohexyl amine. In the fluid blend of the present invention, the elastomeric adhesion agent comprises from about 20 to about 80 parts of the blend and preferably from about 20 to about 50 parts. This composition by weight does not include the volume of naphtha or any other solvent in which the aminofunctional methylpolysiloxane is dispersed. Preferably, the elastomeric adhesion agent comprises from about 20 parts to about 60 parts of the blend.

The fluid blend also comprises a curing agent which assists the entire fluid blend to cure upon the air bladder into an expandable repetitive release film, especially those agents which are not self-curing. The curing agent may be described as aminofunctional di-organopolysiloxane fluids having the following general formula:

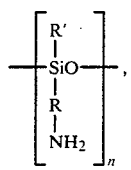

where n is a number up to 30, where R represents the same divalent radicals as above, and where R' represents the same monovalent radicals as above.

The aminofunctional di-organopolysiloxane fluid is commercially available from SWS Silicones Corporation as Silicone Fluids F-751, F-756, F-801, and F-808. Also, it is available from Dow Corning Co. as Dow 531 and Dow 536 fluid. In the fluid blend of the present invention, the curing agent comprises from about 4 to about 25 parts of the fluid blend. Preferably, the curing agent comprises from about 8 to about 12 parts of the blend.

The fluid blend also comprises a slip agent selected from the group consisting of polyalkylene glycols and di-organopolysiloxane fluids. The polyalkylene glycols have the following general formula:

$$HO[-R'''-O-]_t C_2H_4OH,$$

where R''' is an alkylene radical or an alkoxy-substituted alkylene radical having from 1–8 carbon atoms and combinations thereof and where t is a number from 2–80.

Representative examples of polyalkylene glycols are polyethylene glycol, polypropylene glycol, and polybutylene glycol. Representative examples of alkoxy-substituted polyalkylene glycols are methoxy polyethylene glycol and ethoxy polyethylene glycol. The polyalkylene glycols are available from Dow Corning Co. in the E-200–E-4000 series and also available under the trademark Carboxwax® from Union Carbide.

The di-organopolysiloxane fluid has the following general formula:

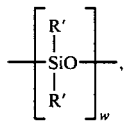

where w is a number greater than 5 and where R' represents the same monovalent hydrocarbon radicals or halogenated monovalent hydrocarbon radicals as above, R' being the same or different in this formula. Of these chemicals, the di-organopolysiloxane fluid is preferred in a viscosity range from about 100,000 centapoises to about 2,500,000 centapoises. Preferably, the viscosity of the di-organopolysiloxane fluid is about 600,000 centapoises. The di-organopolysiloxane fluid is commercially available from Union Carbide Company as L45 fluid and also as 467 Emulsion. Also, the slip agent is commercially available from Dow Corning Company, existing and described as Dow Corning 200 Fluid and also as HV 490 Fluid. In the fluid blend, the slip agent comprises from about 5 to about 80 parts, and preferably comprises from about 10 to about 60 parts.

In the fluid blend, the slip agent serves to permit movement of the uncured tire carcass in the tire press relative to the air bladder during expansion of the air bladder and also to permit movement of the air bladder relative to the cured tire during contraction.

The fluid blend also comprises a release agent for the maintained physical and chemical separation of the curing tire from the air bladder at the expandable repetitive release film. The release agent is selected from the group consisting of silazane fluids, and mono-organopolysiloxane fluids.

The silazane fluids have the following general formula:

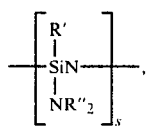

where R' represents the same monovalent radicals as above, where R'' represents hydrogen and the same monovalent aliphatic hydrocarbon radicals as above, and where s is a number from 1 to 30.

Representative examples of R' are methyl and ethyl. Representative examples of R'' are hydrogen and methyl. The silazane resin blends are commercially available from Frekote Corporation.

The mono-organopolysiloxane fluids are preferred and have the following general formula:

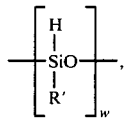

where w is a number greater than 5 and where R' represents the same monovalent hydrocarbon radicals or halogenated monovalent hydrocarbon radicals as above.

Of these mono-organopolysiloxane fluids useful as a release agent, methyl hydrogen polysiloxane is preferred. It has been found that the release agents are sensitive to an amine catalysis to polymerize with the other constituents of the fluid blend to form an expandable repetitive release film for the air bladder. The methyl hydrogen polysiloxane is commercially available by the following companies: Rhodia Corporation No. 68, Union Carbide Company L31, Union Carbide Company RE 28, and Dow Corning Company 1107 fluid and 1107 Emulsion. The release agent comprises from about 20 to about 80 parts of the fluid blend and, preferably, comprises from about 20 to about 60 parts of the blend.

The fluid blend comprising the elastomeric adhesive agent, the curing agent, the slip agent, and the release agent, may be mixed with or without the use of a solvent at ambient temperatures and pressures. Preferably, a solvent is used to induce mixing of the various agents in the fluid blend. Solvents such as water, fluorinated and chlorinated hydrocarbons, aromatic hydrocarbon, and aliphatic hydrocarbons are available as solvents for the fluid blend. The solvent may either exist in a hot solvent form or a cold solvent form. For the hot solvent form, water or a medium boiling aliphatic organic solvent such as mineral spirits, or any other conventional solvent of this class, may be employed to adequately apply the fluid blend to the air bladder. A cold solvent may typically be 1,1,1 trichloroethane, or trichlorotrifluoroethane. The decision to use the fluid blend in a hot solvent or a cold solvent depends upon the choice of the tire manufacturer. The fluid blend in a cold solvent is designed for application to a cool air bladder, whereas the fluid in the hot solvent is designed for application to a warm air bladder.

The fluid blend may be applied by spraying, brushing, wiping, painting, or any other method which physically applies an even coat over the air bladder. Excess solvent may be removed from the bladder or other portions of the tire apparatus. Whenever the fluid blend is in a cold solvent, more than one coat of the blend may be necessary on the air bladder. It has been found that approximately 3 to 5 minutes is necessary for the solvent to vaporize. The fluid blend may then be cured onto the air bladder at temperatures reached during the curing and vulcanization of the tire carcass in tire apparatus. These bladder temperatures typically reach from about 175° F. to about 350° F. The curing of fluid blend onto the air bladder occurs within approximately 5 minutes.

The cured application of the fluid blend onto the air bladder creates an expandable repetitive release film to repeatedly bleed air from between the air bladder and the carcass, to repeatedly maintain slip between the bladder and the tire, and to repeatedly release the air bladder from the cured tire after molding and curing of the carcass in the apparatus. It has been found that because the curing of the fluid blend into an expandable repetitive release film occurs on the air bladder, this in situ formation of the film withstands significant and repeated expansion and contraction of the air bladder under temperature and pressure conditions conventional for the production of tires. It has also been found that the fluid blend need only be applied once every 4 hours or greater durational sequences in tire production, whereas the conventional art requires attention to the interior of each and every tire entering the molding and curing apparatus. This reduction in labor and capital streamlines the tire production process prior to and during tire production in the molding and curing apparatus, with significant economic and energy savings to the industry.

The fluid blend comprising the adhesion agent, the curing agent, the slip agent, and the release agent synergistically combine to produce an expandable repetitive release film having excellent air bleed qualities. Because the air bleed qualities of the film are derived from fluids, the need for solids and fillers to provide fissures and channels through which entrapped air can escape is eliminated. Further, the elimination of the solids and fillers as air bleed agents permits lasting application of the fluid blend to the air bladder for repeated tire production, whereas solids and fillers are confined to individual applications to the inside of the tire carcass.

For a greater understanding of the significant improvements to the release agency properties in tire production, reference is had to the following example.

EXAMPLE

A fluid blend having (a) 28 gms of aminofunctional di-methylpolysiloxane resin dispersed in 12 gms of naphtha (sold by SWS Silicones Corporation as RTV-1 dispersion SWS-960); which cures at room temperature (b) 8 gms of aminofunctional di-methylpolysiloxane fluid (sold by SWS Silicones Corporation as F-808 Fluid); (c) 40 gms of methyl hydrogen polysiloxane fluid (sold by Dow Corning Company as 1107 Fluid); and (d) 20 gms of dimethyl polysiloxane fluid (sold by Dow Corning Co. as 200 Fluid) were mixed to form the fluid blend mixed at ambient temperature and pressure dissolved in 1,1,1 trichloroethane at the molding and curing apparatus, the fluid blend was applied to the entire exterior surface of the air bladder. After evaporation of the solvent, the tire apparatus was closed and heated to standard curing temperatures to form the expandable repetitive release film on the air bladder. Tire production, without the conventional release material on the interior of the tire carcass, ensued for approximately four hours before the fluid blend was reapplied to the air bladder. When employed on four tire molding presses for several days, approximately 3,000 tires were cured during this test but only 2 tires were blemished because of trapped air within the cured tire. There were no sealing or bladder coating problems, and the expandable repetitive release film on air bladder of each molding and curing press withstood repeated expansion and contraction of the air bladder under conventional temperature and pressure production conditions.

From the above description, it is apparent that a detailed description of the best mode and preferred embodiment has been presented. However, the invention is not to be construed as limited thereto or thereby. Consequently, for an understanding of the scope of this invention, reference is had to the following claims.

What is claimed is:

1. A method for the releasable placement of an uncured tire carcass in a tire mold having an expandable air bladder therewithin, comprising the steps of:

applying a fluid blend having release properties enduring multiple repetitions of expansion and contraction of the expandable item to the surface of the air bladder of the tire mold;

curing said fluid blend on said air bladder to create an expandable release film for repeated tire curing production;

wherein said fluid blend consists essentially of from about 20 to 80 parts of an adhesion agent, from about 4 to about 25 parts of a curing agent, from about 5 to about 80 parts of a slip agent, and from about 20 to about 80 parts of a release agent;

wherein said adhesion agent is an aminofunctional diorganopolysiloxane resin having the following formula:

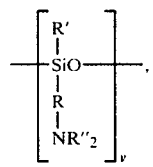

where v is a number up to 20,000; where R represents a divalent radical selected from the group consisting of a divalent hydrocarbon radical having from 1 to 10 carbon atoms, $(OC_2H_4)_r$, $(OHC_2)_r$, $(OC_3H_6)_r$, where r is a number from 1 to 50 and an unsaturated divalent hydrocarbon radical having from 2 to 10 carbon atoms;

where R' represents a monovalent radical having from 1 to 18 carbon atoms and selected from the group consisting of hydrocarbons and halogenated hydrocarbons, wherein R'' is selected from the group consisting of hydrogen and a monovalent hydrocarbon radical having from 1 to 12 carbon atoms; R'' being the same or different in bonding to N;

said curing agent having the following formula:

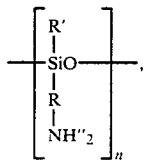

wherein n is a number up to 30, where R represents the same divalent radicals as described in said formula for said adhesion agent, and where R' represents the same monovalent radicals as described in said formula for said adhesion agent;

said slip agent selected from the group consisting of polyalkylene glycols and di-organopolysiloxane fluids, and combinations thereof, said polyalkylene glycols having the following formula:

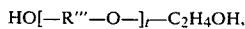

where R''' is an alkylene radical or an alkoxy-substituted alkylene radical having from 1 to 8 carbon atoms, and combinations thereof, and where t is a number from 2 to 80;

said di-organopolysiloxane fluids having the following formula:

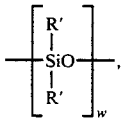

where w is a number greater than 5 and where R' represents he same monovalent radicals as described in said formula for said adhesion agent;

wherein said di-organopolysiloxane fluids have a viscosity range of from about 100,000 to about 2,500,000 centipoise, and said release agent selected from the group consisting of silazane fluids, mono-organopolysiloxane fluids and combinations thereof, said silazane fluids having the following formula:

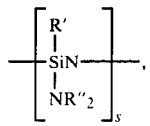

where s is a number from 1 to 30, where R' represents the same monovalent radicals as described in said formula for said adhesion agent, and where R'' represent hydrogen and the same monovalent radicals as described in said formula for said adhesion agent;

said mono-organopolysiloxane fluids having the following formula:

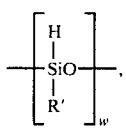

where w is a number greater than 5 and where R' represents the same monovalent radicals as described in said formula for said adhesion agent.

2. A method for the releasable placement of an uncured tire carcass in a tire mold having an expandable air bladder therewithin, according to claim 1, wherein said applying step comprises application to the air bladder after several hours of said tire curing production.

3. A method for the release placement of an uncured tire carcass in a tire mold having an expandable air bladder therewithin, according to claim 2, wherein said curing comprises heating said repetitive release fluid blend in the tire mold at temperatures from about 175° F. to about 350° F.

4. A method for the releasable placement of an uncured tire carcass in a tire mold having an expandable air bladder therewithin, according to claim 3, wherein said adhesion agent has about 50 parts in said blend; wherein said curing agent has from about 8 to about 12 parts in said blend; wherein said slip agent has from about 10 to about 60 parts in said blend; and wherein said release agent has from about 20 to about 60 parts in said blend.

5. A method for the releasable placement of an uncured tire carcass in a tire mold having an expandable air bladder therewithin, according to claim 4, wherein said adhesion agent is aminofunctional di-organopolysiloxane resin; wherein said slip agent is a di-organopolysiloxane fluid; and wherein said release agent is a mono-organopolysiloxane fluid.

6. A method for the release placement of an uncured tire carcass in a tire mold having an expandable air bladder therewithin, according to claim 5, wherein said curing agent is an aminofunctional dimethylpolysiloxane fluid; wherein said slip agent in a dimethylpolysiloxane fluid having a viscosity of about 600,000 centipoise, and wherein said release agent in a methyl hydrogen polysiloxane fluid.

7. A method for the release placement of an uncured tire carcass in a tire mold having an expandable air bladder therewithin, according to claim 5, wherein said adhesion agent releases a cyclohexyl amine upon self-curing.

* * * * *